UNITED STATES PATENT OFFICE.

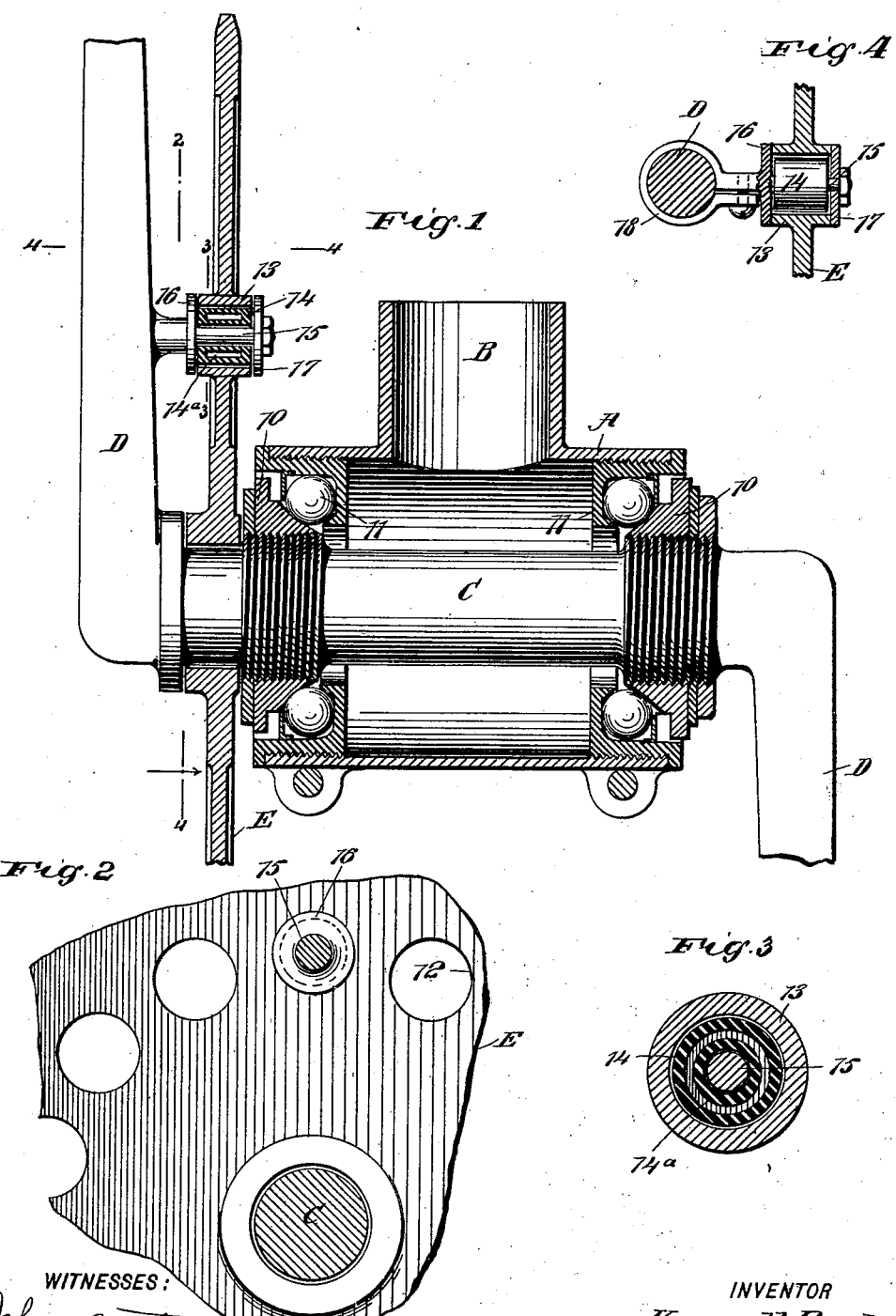

KARMELL BROOKS, OF NEW YORK, N. Y.

DRIVING MECHANISM FOR BICYCLES.

SPECIFICATION forming part of Letters Patent No. 710,245, dated September 30, 1902.

Application filed March 7, 1901. Serial No. 50,206. (No model.)

*To all whom it may concern:*

Be it known that I, KARMELL BROOKS, a citizen of the United States, and a resident of the city of New York, borough of Manhattan, in the county and State of New York, have invented a new and Improved Driving Mechanism for Bicycles, of which the following is a full, clear, and exact description.

The purpose of the invention is to loosely mount the front sprocket on the crank-shaft of a bicycle and drive the said sprocket from the crank or pedal arm of the crank or pedal shaft through a cushioned yet positive connection, the connection between said parts being such as will tend to obviate severe shock to the machine in operation and which will add to its lifetime, as well as contribute to the comfort of the rider.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through the crank-hanger of a bicycle and the front sprocket-wheel and a section through a driving connection between the front sprocket-wheel and a crank or pedal arm of the crank or pedal shaft. Fig. 2 is a section on the line 2 2 of Fig. 1. Fig. 3 is a section on the line 3 3 of Fig. 1; and Fig. 4 is a section on the line 4 4 of Fig. 1, illustrating another manner of making the connection between the crank-arm of the crank or pedal shaft and the front sprocket-wheel of the bicycle.

A represents the crank-hanger, having the usual collar B to receive the center brace of the bicycle-frame, and C represents the crank or pedal shaft, having the usual crank or pedal arms D. The pedal or crank shaft C is held to turn by ball-bearings located within the crank-hanger A, comprising cones 10, screwed upon or otherwise attached to the pedal-shaft, and ball-races 11, secured to the hanger, and through which the pedal-shaft is loosely passed.

The main features of the invention are as follows: The front sprocket-wheel E is loosely mounted upon the pedal-shaft between one end of the hanger A and a crank or pedal arm D. The front sprocket-wheel E is provided with one or with a series of openings 12, preferably circular, as shown in Fig. 2. A sleeve 13 is fitted into one of these openings 12, and usually the sleeve extends beyond opposite faces of said front sprocket-wheel, as is shown in Figs. 1 and 4. This sleeve is secured to the sprocket-wheel E by threads, solder, or by other means.

A tubular cushion 14 is fitted in the sleeve 13, and the cushion, which is preferably of rubber or a like material, is provided with a chamber $14^a$ between its outer and inner faces. The chamber $14^a$, however, may be dispensed with, but when used tends to add to the elasticity of the cushion.

A pin 15 is carried by the crank or pedal shaft C, and this pin is passed through the central opening in the cushion, and the cushion 14 is held in place in its sleeve 13 by washers 16 and 17, having bearing against the ends of the sleeve, the said washers being held in position by a nut or like device, as is also shown in Figs. 1 and 4.

In Fig. 1 the pin 15 is shown as integral with the pedal-arm carrying it; but in Fig. 4 the pin is shown clamped upon the pedal-arm, the clamp 18 constituting a continuation of one end of the pin, and the sleeve 13 is shown as a part of the wheel E. Under this construction it will be observed that as the crank or pedal shaft revolves it communicates motion to the front sprocket-wheel E through one of the crank or pedal arms D, and it will be further observed that while the connection between the pedal-arm and the front sprocket-wheel is a positive one, yet the connection is cushioned to such an extent as will prevent a severe shock to the machine in operation and which will contribute to the comfort of the rider.

The improved driving device is simple and effective and can be readily applied to any bicycle or similar machine.

Having thus described my invention, I claim as new and desire to secure by Letters Patent—

1. In a driving mechanism for bicycles and similar machines, a pedal-shaft and its crank-arms one of the crank-arms being provided with a lateral projection, a driving-wheel loosely mounted on the said pedal-shaft, and a cushion connection between the said driving-wheel and the projection of the crank-arm of the pedal-shaft, as set forth.

2. In a driving mechanism for bicycles and similar machines, a crank or pedal shaft and its crank or pedal arms, a front sprocket-wheel loosely mounted on the pedal or drive shaft adjacent to one of the said arms of the crank or pedal shaft and provided with an opening, and a lateral projection on one of said arms of said crank or pedal shaft, which projection is yieldingly held in the opening of the front sprocket-wheel, as set forth.

3. In a driving mechanism for bicycles and similar machines, a pedal or crank shaft, crank or pedal arms carried by the shaft, a bearing for said crank or pedal shaft, a forward sprocket-wheel loosely mounted on said shaft between its bearings and one of its crank or pedal arms, the said wheel being provided with an opening therein, a cushion located within said opening, a pin extending through the said cushion from the crank-arm adjacent to the forward sprocket-wheel, and means for holding said pin in position in said forward sprocket-wheel, as set forth.

4. In a driving mechanism for bicycles and like machines, the combination with the drive or pedal shaft and its crank or pedal arms, of a forward sprocket-wheel loosely mounted on said shaft, said wheel being provided with an opening therein and a sleeve secured in said opening, a tubular cushion located within said sleeve, and a pin secured to one of the crank or pedal arms and passed through the said cushion, and means for retaining the pin in position in the sprocket-wheel, as set forth.

5. In a driving mechanism for bicycles and like machines, the combination with a drive or pedal shaft, and its crank or pedal arm, of a sprocket-wheel loosely mounted on the said shaft and provided with an opening and an annular flange surrounding the opening on each face of the wheel, a cushion in said opening, a pin secured to the pedal-arm and passing through the said cushion and provided with a nut on its end, and washers on the pin and bearing against the flanges, around the opening in the wheel, as set forth.

In testimony whereof I have signed my name to this specification in the presence of two subscribing witnesses.

KARMELL BROOKS.

Witnesses:
J. FRED. ACKER,
EVERARD BOLTON MARSHALL.